(12) United States Patent
Kim

(10) Patent No.: US 12,153,887 B2
(45) Date of Patent: *Nov. 26, 2024

(54) DEEP LEARNING-BASED METHOD FOR FILTERING OUT SIMILAR TEXT, AND APPARATUS USING SAME

(71) Applicant: SELECT STAR, INC., Daejeon (KR)

(72) Inventor: Se Yeob Kim, Seoul (KR)

(73) Assignee: SELECT STAR, INC., Daejeon (KR)

( * ) Notice: Subject to any disclaimer, the term of this patent is extended or adjusted under 35 U.S.C. 154(b) by 228 days.

This patent is subject to a terminal disclaimer.

(21) Appl. No.: 17/771,221

(22) PCT Filed: Oct. 20, 2020

(86) PCT No.: PCT/KR2020/014337
§ 371 (c)(1),
(2) Date: Apr. 22, 2022

(87) PCT Pub. No.: WO2021/118040
PCT Pub. Date: Jun. 17, 2021

(65) Prior Publication Data
US 2022/0374601 A1    Nov. 24, 2022

(30) Foreign Application Priority Data
Dec. 10, 2019  (KR) .......................... 10-2019-0164009

(51) Int. Cl.
*G06F 40/289*    (2020.01)
*G06F 16/35*    (2019.01)
(Continued)

(52) U.S. Cl.
CPC .......... *G06F 40/289* (2020.01); *G06F 16/355* (2019.01); *G06F 40/216* (2020.01); *G06F 40/30* (2020.01); *G06N 20/00* (2019.01)

(58) Field of Classification Search
CPC ....... G06N 20/00; G06F 40/30; G06F 40/289; G06F 40/216; G06F 16/355
See application file for complete search history.

(56) References Cited

U.S. PATENT DOCUMENTS 10,803,464 B1 *  10/2020  Yee ..................... G06Q 20/0425
11,830,237 B2 *  11/2023  Kim ..................... G06V 10/761
(Continued)

FOREIGN PATENT DOCUMENTS

KR    10-2016-0085004    7/2016
KR    10-2019-0125428    11/2019

OTHER PUBLICATIONS

Office Action for Korea Patent Application No. 10-2019-0164009, dated Jan. 15, 2020.
(Continued)

*Primary Examiner* — Samuel G Neway

(57) ABSTRACT

According to the present invention, provided is a method for collecting filtered text data, comprising the steps in which: a computing device acquires first text data and records the first text data in a text data pool; the computing device acquires second text data; the computing device performs a calculation in a deep learning model by using the first text data and the second text data as input values and calculates a first feature vector corresponding to the first text data and a second feature vector corresponding to the second text data; and the computing device compares the degree of similarity between the first feature vector and the second feature vector, and records the second text data in the text data pool when the degree of similarity is less than a predetermined value.

7 Claims, 6 Drawing Sheets

(51) Int. Cl.
    *G06F 40/216*     (2020.01)
    *G06F 40/30*     (2020.01)
    *G06N 20/00*     (2019.01)

(56) References Cited

U.S. PATENT DOCUMENTS

| | | | |
|---|---|---|---|
| 2009/0220166 A1 | 9/2009 | Choi et al. | |
| 2014/0046945 A1* | 2/2014 | Deolalikar | G06F 16/93 707/737 |
| 2016/0247064 A1* | 8/2016 | Yoo | G06N 3/082 |
| 2017/0132288 A1* | 5/2017 | Ho | G06F 16/243 |
| 2019/0197129 A1* | 6/2019 | Yong | G06F 40/247 |
| 2019/0244094 A1* | 8/2019 | Ramsl | G06N 3/02 |
| 2019/0294588 A1* | 9/2019 | Xu | G06F 40/131 |
| 2020/0250374 A1* | 8/2020 | Huang | H04L 9/0637 |
| 2020/0320348 A1* | 10/2020 | Yang | G06F 40/284 |
| 2020/0321110 A1* | 10/2020 | Neumann | G06N 20/00 |
| 2020/0410056 A1* | 12/2020 | Chen | G06N 20/00 |
| 2022/0374601 A1* | 11/2022 | Kim | G06F 40/289 |

OTHER PUBLICATIONS

PCT International Search Report for International Application No. PCT/KR2020/014337, Date of Mailing: Dec. 30. 2020.

Lee, Soon-Haeng et al., "A Survey on Detecting Duplicate Documents in World Wide Web Environment" Database Research vol. 25 No. 1, Apr. 2009.

Lim, Geun-Young et al., "The Sentence Similarity Measure Using Deep-Learning and Char2Vec" Journal of the Korea Institute of Information and Communication Engineering, vol. 22, No. 10: 1300-1306, Oct. 2018.

\* cited by examiner

DEEP LEARNING-BASED METHOD FOR FILTERING OUT SIMILAR TEXT, AND APPARATUS USING SAME

CROSS-REFERENCE TO PRIOR APPLICATIONS

This application is a National Stage Patent Application of PCT International Patent Application No. PCT/KR2020/014337 (filed on Oct. 20, 2020), which claims the benefit of priority of Korean Patent Application No. 10 2019 0164009 (filed on Dec. 10, 2019), which are all hereby incorporated by reference in their entirety.

TECHNICAL FIELD

The present invention relates to a method for collecting filtered text data, the method including: acquiring, by a computing apparatus, first text data, and recording the first text data in a text data pool; acquiring, by the computing apparatus, second text data; performing, by the computing apparatus, an operation in a deep learning model by using the first text data and the second text data as input values, and calculating a first feature vector corresponding to the first text data and a second feature vector corresponding to the second text data; and comparing, by the computing apparatus, a degree of similarity between the first feature vector and the second feature vector, and recording the second text data in the text data pool when the degree of similarity is less than a predetermined value.

BACKGROUND ART

In modern times, infinite information is flooding. It is not easy to select and collect only necessary information from the infinite information. Furthermore, when various information (e.g., an image or a text) are collected, the collection has to be performed by filtering out similar information as much as possible, but it has not been easy to perform filtering while comparing the information one by one.

Accordingly, the present inventor intends to propose a deep learning-based method for filtering out a similar text, and an apparatus using the same.

INVENTION

Technical Problem

An object of the present invention is to solve all the problems described above.

Another object of the present invention is to perform collection by filtering out similar information in collecting various information (e.g., an image or a text).

In addition, still another object of the present invention is to more efficiently filter out similar information by determining a degree of similarity between information by using a deep learning model.

Technical Solution

A characteristic configuration of the present invention for achieving the objects of the present invention described above and implementing characteristic effects of the present invention that will be described below is as follows.

According to one aspect of the present invention, there is provided a method for collecting filtered text data, the method including: acquiring, by a computing apparatus, first text data, and recording the first text data in a text data pool; acquiring, by the computing apparatus, second text data; performing, by the computing apparatus, an operation in a deep learning model by using the first text data and the second text data as input values, and calculating a first feature vector corresponding to the first text data and a second feature vector corresponding to the second text data; and comparing, by the computing apparatus, a degree of similarity between the first feature vector and the second feature vector, and recording the second text data in the text data pool when the degree of similarity is less than a predetermined value.

In addition, according to another aspect of the present invention, there is provided a computing apparatus, which is an apparatus for collecting filtered text data, the computing apparatus including: a communication unit for acquiring first text data and second text data; and a processor for recording the first text data in a text data pool, performing an operation in a deep learning model by using the first text data and the second text data as input values, calculating a first feature vector corresponding to the first text data and a second feature vector corresponding to the second text data, comparing a degree of similarity between the first feature vector and the second feature vector, and recording the second text data in the text data pool when the degree of similarity is less than a predetermined value.

Advantageous Effects

According to the present invention, the following effects can be obtained.

According to the present invention, collection can be performed by filtering out similar information in collecting various information (e.g., an image or a text).

In addition, according to the present invention, similar information can be more efficiently filtered out by determining a degree of similarity between information by using a deep learning model.

MODE FOR INVENTION

Figure 1:
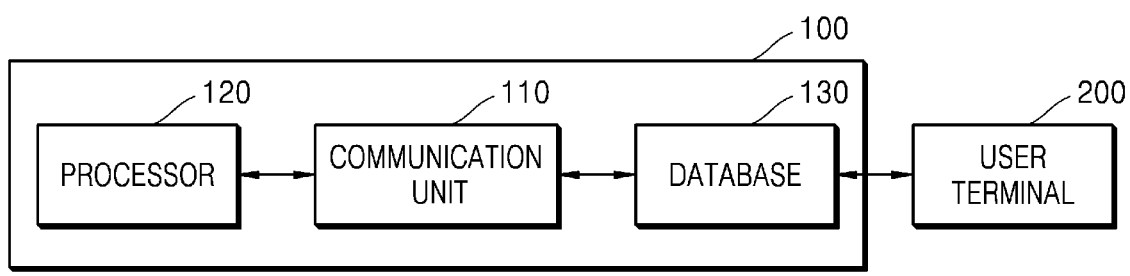
FIG. 1 is a view showing a schematic configuration of a computing apparatus according to one embodiment of the present invention.

The following detailed descriptions of the present invention are given for specific embodiments in which the present invention may be practiced with reference to the accompanying drawings that illustrate the specific embodiments.

These embodiments are described in sufficient detail to enable those skilled in the art to practice the present invention. It should be understood that various embodiments of the present invention are different from each other, but need not be mutually exclusive. For example, specific shapes, structures, and characteristics described herein may be implemented and changed from one embodiment to another embodiment without departing from the idea and scope of the present invention. In addition, it should be understood that locations or arrangements of individual elements within each embodiment described herein may be changed without departing from the idea and scope of the present invention. Therefore, the following detailed description is not intended to be taken in a limiting sense, and the scope of the invention is defined only by the appended claims while encompassing the scope of all equivalents of the claimed invention when appropriately described. In the drawings, like reference numerals refer to elements that perform like or similar functions in various aspects.

Hereinafter, in order to enable a person having ordinary skill in the art to which the present invention pertains to easily practice the present invention, preferred embodiments of the present invention will be described in detail with reference to the accompanying drawings.

FIG. 1 is a view showing a schematic configuration of a computing apparatus according to one embodiment of the present invention.

As shown in FIG. 1, according to the present invention, a computing apparatus 100 may include a communication unit 110 and a processor 120. In some cases, unlike FIG. 1, the computing apparatus 100 may not include a database 130.

First, the communication unit 110 of the computing apparatus 100 may be implemented with various communication technologies. In other words, Wi-Fi, wideband CDMA (WCDMA), high speed downlink packet access (HSDPA), high speed uplink packet access (HSUPA), high speed packet access (HSPA), mobile WiMAX, WiBro, long term evolution (LTE), 5G, Bluetooth, infrared data association (IrDA), near field communication (NFC), Zigbee, a wireless LAN technology, and the like may be applied to the communication unit 110. In addition, when the communication unit 110 is connected to the Internet to provide a service, the communication unit 110 may conform to TCP/IP, which is a standard protocol for information transmission on the Internet.

Next, according to the present invention, the database 130 may store acquired data (e.g., an image or a text) and a data pool. For reference, when an external database is used, the computing apparatus 100 may access the external database through the communication unit 110.

In addition, the computing apparatus 100 may communicate with a user terminal 200 through the communication unit 110. In this case, any digital device configured to perform communication, having a memory device, and equipped with a microprocessor to have operating ability, such as a desktop computer, a laptop computer, a workstation, a PDA, a web pad, a mobile phone, a smart remote control, or various IoT main devices, may correspond to the user terminal 200 according to the present invention.

Meanwhile, the processor 120 will be described in detail below.

First, according to the present invention, the computing apparatus 100 may intend to collect various text data, and perform a process of filtering out similar text data through filtering. Hereinafter, the process will be described.

Figure 2:
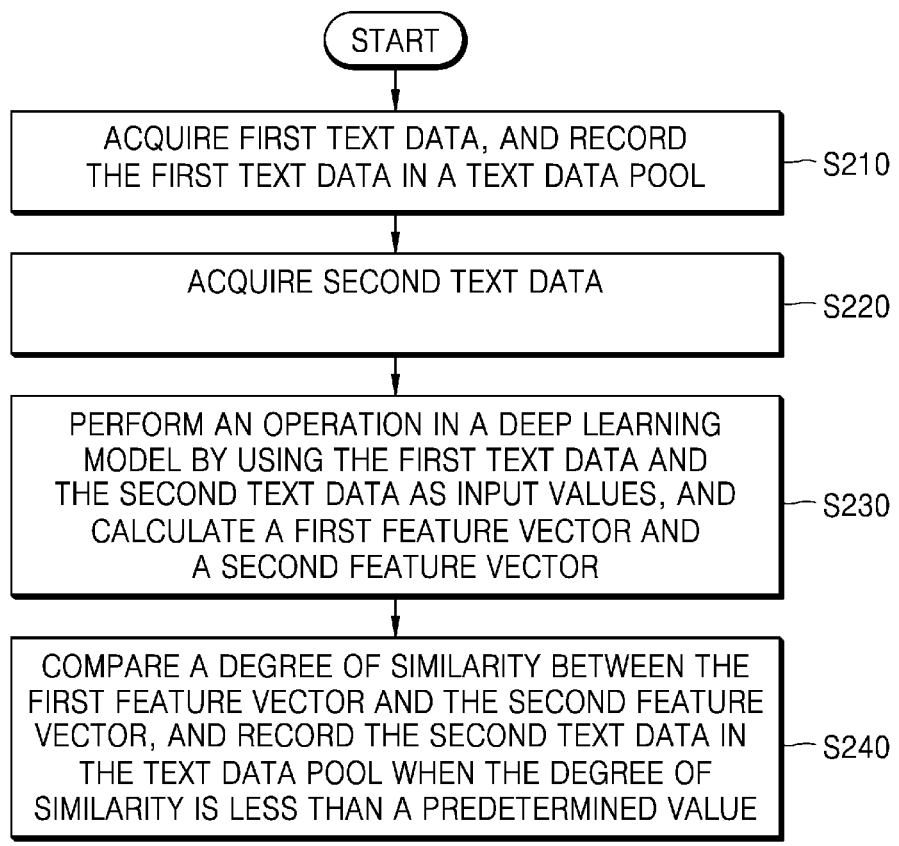
FIG. 2 is a view showing a process for recording new text data in a text data pool according to one embodiment of the present invention.

FIG. 2 is a view showing a process for recording new text data in a text data pool according to one embodiment of the present invention.

The processor 120 of the computing apparatus 100 may acquire first text data, and record the first text data in a text data pool (S210). In this case, the data pool may be an aggregate of a plurality of pieces of acquired text data, and may be stored in the database 130. In addition, it may be considered to record only various text data in the data pool, and similar text data may be filtered out through a process that will be described below, or the like.

After the first text data is acquired, the processor 120 of the computing apparatus 100 may acquire second text data (S220). In this case, the first text data may correspond to existing data recorded in the text data pool, and the second text data may correspond to new data.

A scheme of acquiring the first text data or the second text data in the computing apparatus 100 according to the present invention may include a scheme such as crowdsourcing.

The crowdsourcing is a compound word of crowd and outsourcing, and refers to an operation of allowing the public to participate in some process of business activities. According to the present invention, the public may participate in collecting data, and various data that are difficult to be collected with a small number of people may be acquired.

Figure 3:
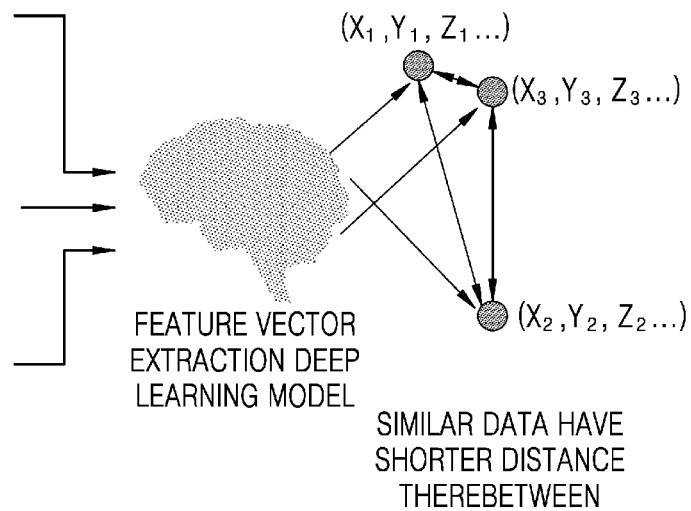
FIG. 3 is a view showing a state in which an operation is performed in a deep learning model by using text data as an input value according to one embodiment of the present invention.

FIG. 3 is a view showing a state in which an operation is performed in a deep learning model by using text data as an input value according to one embodiment of the present invention.

The processor 120 may perform an operation in a deep learning model by using the first text data and the second text data as input values. In some cases, the deep learning model may include a convolution layer.

In this case, the convolution layer may include a plurality of layers, and an operation may be performed while passing text data through each of the layers so as to filter out unnecessary portions and reduce complexity.

A first feature vector may be calculated when an operation is performed in the deep learning model by using the first text data as an input value, and a second feature vector may be calculated when an operation is performed in the deep learning model by using the second text data as an input value (S230).

In other words, the processor 120 may sequentially perform operations while passing the first text data through a plurality of convolution layers to calculate the first feature vector, and sequentially perform operations while passing the second text data through the convolution layers to calculate the second feature vector.

For reference, the first feature vector may correspond to a first point that is present in an N dimension, and the second feature vector may correspond to a second point that is present in the N dimension. Therefore, a degree of similarity between the first feature vector and the second feature vector may be determined by measuring a distance between the first point and the second point.

In this case, the N dimension may be determined according to a value of a feature vector, so that when a feature vector is (x1, y1, z1), the feature vector may correspond to a three dimension, and when a feature vector is (x1, y1, z1, r1), the feature vector may correspond to a four dimension. Therefore, a feature vector may correspond to a coordinate of any one point in each dimension.

As an example with reference to FIG. 3 to assist the description, when an operation is performed in the deep learning model on a phrase "Tell me what the weather is like" (Phrase No. 1), a feature vector of x1, y1, z1 may be generated, when an operation is performed in the deep learning model on a phrase "Hey, what is the weather like today" (Phrase No. 2), a feature vector of x3, y3, z3 may be generated, and when an operation is performed in the deep learning model on a phrase "Would you tell me what the weather is like?" (Phrase No. 3), a feature vector of x2, y2, z2 may be generated.

In this case, the feature vector may correspond to one point that is present in a three dimension. With regard to each of the feature vectors obtained by the operations from the phrases of FIG. 3, it may be found that a distance between x1, y1, z1 and x3, y3, z3 is short.

The x1, y1, z1 may be the feature vector obtained by the operation from the phrase "Tell me what the weather is like" (Phrase No. 1), and the x3, y3, z3 may be the feature vector obtained by the operation from the phrase "Would you tell me what the weather is like?" (Phrase No. 3).

In other words, the two text data may have a similar form in terms of a word arrangement and the like except for the presence or absence of honorifics, and as a result, it may be found that a distance between the above two feature vectors is shorter than a distance to another feature vector.

Next, the processor 120 may compare the degree of similarity between the first feature vector and the second feature vector, and record the second text data in the text data pool when the degree of similarity is less than a predetermined value (S240).

As described above, the degree of similarity may be determined by measuring a distance between a point indicated by the first feature vector and a point indicated by the second feature vector, and the predetermined value may vary according to settings.

In other words, the processor 120 may determine whether to record the second text data (new text) in the text data pool according to a distance between the first feature vector corresponding to the first text data (existing text) that is previously recorded in the text data pool and the second feature vector corresponding to the second text data (new text).

For example, when the distance between the first feature vector and the second feature vector is longer than a preset value, the degree of similarity may be less than the predetermined value, and the first text data and the second text data may be determined to be dissimilar to each other.

Therefore, since the second text data, which is the new text, is different from the existing data, the processor 120 that intends to collect various text data may record the second text data in the text data pool.

On the contrary, when the distance between the first feature vector and the second feature vector is shorter than or equal to the preset value, the degree of similarity may be greater than or equal to the predetermined value, and the first text data and the second text data may be determined to be similar to each other.

Therefore, since the second text data, which is the new text, is identical/similar to the existing data, the processor 120 that intends to collect various text data may not record the second text data in the text data pool. In other words, the second text data may be filtered out.

Meanwhile, the processor 120 may group a plurality of pieces of text data recorded in the text data pool based on a degree of proximity of each of a plurality of feature vectors corresponding to the pieces of the text data.

To assist the description, it may be assumed that a point of the first feature vector and a point of the second feature vector are adjacent to each other with a distance therebetween being less than or equal to a certain value, and a point of a third feature vector and a point of a fourth feature vector other than the above points are adjacent to each other with a distance therebetween being less than or equal to the certain value.

In addition, it may be assumed that a group point of the first and second feature vectors and a group point of the third and fourth feature vectors are spaced apart from each other with a distance therebetween being greater than the certain value.

In the above case, the processor 120 may respectively perform grouping by determining the first text data corresponding to the first feature vector and the second text data corresponding to the second feature vector as one first group, and determining third text data corresponding to the third feature vector and fourth text data corresponding to the fourth feature vector as one second group.

In fact, the first text data and the second text data may have similar texts (e.g., a hobby-associated question, etc.), and the third text data and the fourth text data may have similar texts (e.g., an emotion-associated question, etc.).

While the existing data (the first, second, third, and fourth text data, etc.) is recorded in the text data pool, when new text data (fifth text data) is acquired, and a feature vector of the new text data corresponds to the second group, the fifth text data may also be considered to have an 'emotion-associated question'.

Figure 4:
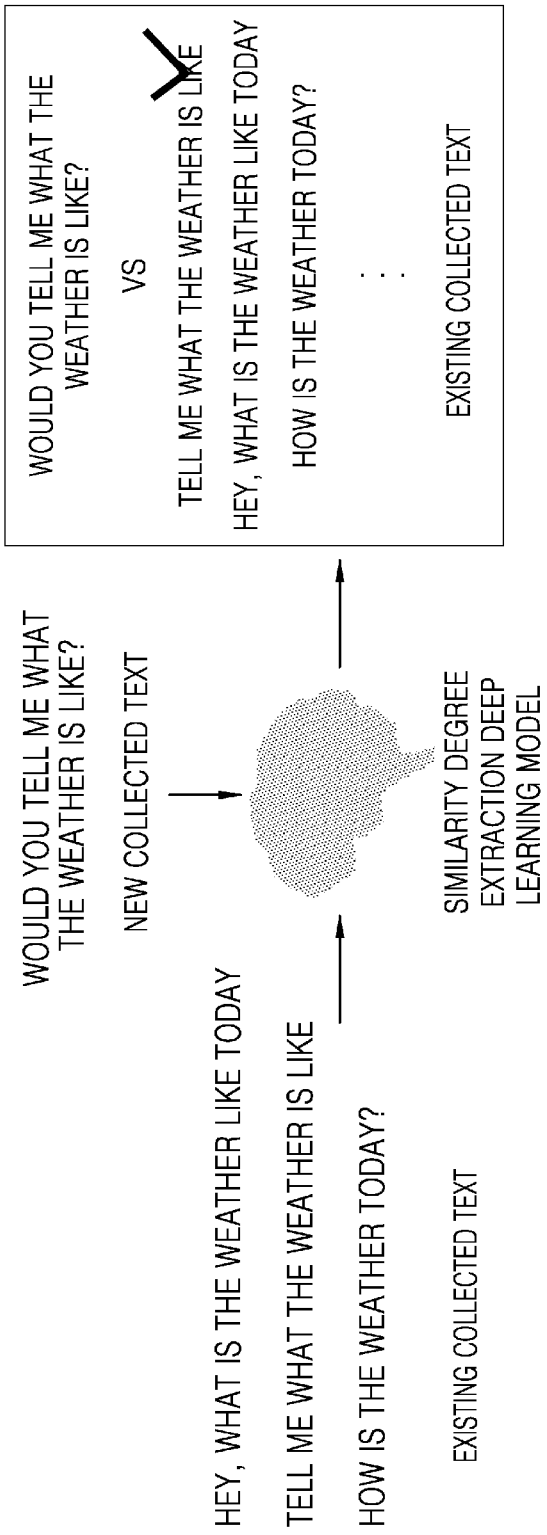
FIG. 4 is a view showing a process of sorting and filtering text data in an order of a degree of similarity according to one embodiment of the present invention.

FIG. 4 is a view showing a process of sorting and filtering text data in an order of a degree of similarity according to one embodiment of the present invention.

It may be assumed that a plurality of pieces of the first text data are recorded in the text data pool (existing collected text), and the pieces of the first text data include first-first text data and first-second text data.

The processor 120 may calculate a first-first feature vector corresponding to the first-first text data and a first-second feature vector corresponding to the first-second text data through operations in the deep learning model.

In addition, the processor 120 may calculate a first degree of similarity between the first-first feature vector and the second feature vector and a second degree of similarity between the first-second feature vector and the second feature vector, and sort the first-first text data and the first-second text data based on a plurality of degrees of similarity.

In detail, a distance between the first-first feature vector and the second feature vector and a distance between the first-second feature vector and the second feature vector may be measured, and the first-first text data and the first-second text data may be sorted in an ascending order of distance.

Specific text data (the first-first text data or the first-second text data) having a degree of similarity that is greater than or equal to the predetermined value among the sorted text data and second text data may be transmitted to the user terminal 200 so as to compare the specific text data and the second text data with each other.

In detail, the processor 120 may transmit text data (specific text data) that is similar to the second text data (new text data) to the user terminal 200 so as to allow a user to determine again whether the specific text data and the second text data are similar to each other, and to determine again whether the specific text data and the second text data are similar to each other according to a text similarity determination program in the user terminal 200.

For reference, although the specific text data has been described above as specifically being one text data, which is the first-first text data or the first-second text data, a plurality of pieces of the specific text data may be provided. This is because a plurality of pieces of text data having a degree of similarity that is greater than or equal to the predetermined value may be present among a plurality of pieces of existing text data (first text data).

Primarily, a similar text state may be measured according to the deep learning model, and secondarily, the similar text state may be measured again in the user terminal 200. Since it is impossible to determine similarity states of many texts one by one, primarily, a similarity state may be determined according to the deep learning model first, and secondarily, the similarity state may be determined again for a specified text.

In addition, the processor 120 may receive whether to record the second text data in the text data pool from the user terminal 200 according to the secondarily measured similar text state.

In detail, when the second text data and the specific text data are determined as similar texts, the processor 120 may not record the second text data in the text data pool.

On the contrary, when the second text data and the specific text data are determined as dissimilar texts, the processor 120 may record the second text data in the text data pool so that the second text data may be included in the existing text data.

The process may be found in FIG. 4, in which three existing texts are sorted in an order of a degree of similarity through the deep learning model, and a new text (top text) and the sorted existing texts are compared with each other.

In this case, since the existing texts are sorted in the order of the degree of similarity with the new text, and a degree of similarity of a first text among the existing texts is greater than the predetermined value, the first text may be determined to be similar to the new text and transmitted to the user terminal 200.

Figure 5:
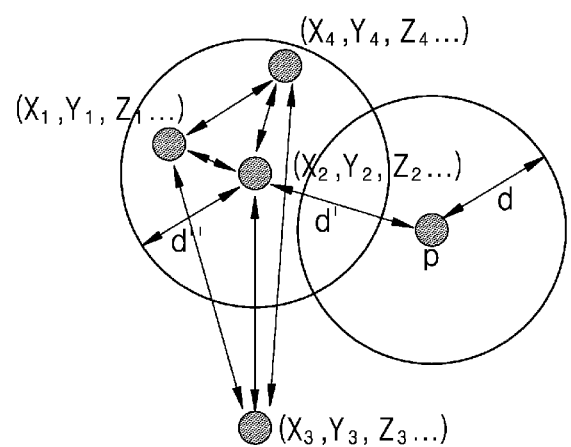
FIG. 5 is a view showing a predetermined feature vector that is adjacent to any one feature vector according to one embodiment of the present invention.

FIG. 5 is a view showing a predetermined feature vector that is adjacent to any one feature vector according to one embodiment of the present invention.

The process of transmitting the specific text data in which the degree of similarity with the new text data is greater than or equal to the predetermined value among the pieces of the text data to the user terminal 200 has been described above with reference to FIG. 4.

In FIG. 5, however, it may be assumed that the specific text data having the degree of similarity that is greater than or equal to the predetermined value is not present.

In addition, it may be assumed that first text data that is determined to be most similar to the second text data (new text data) among the pieces of the first text data (existing text data) is set as re-specified text data.

In other words, although the specific text data having the degree of similarity that is greater than the predetermined value is not present, existing text data that is determined to be most similar to the new text data among the existing text data is set as the re-specified text data.

In addition, it may be assumed that a plurality of predetermined feature vectors in which a degree of similarity with a feature vector of the re-specified text data is greater than or equal to a preset value are present.

Regarding the above configuration with reference to FIG. 5, it may be found that a feature vector of the second text data (new text data) corresponds to a point p, and a feature vector located at a distance adjacent to the point p (within d) is not present. In other words, it may be found that the specific text data in which the degree of similarity with the new text data is greater than or equal to the predetermined value is not present.

In this case, x2, y2, z2 may be present as existing text data located at a shortest distance d' from the point p, and the x2, y2, z2 may be set as the re-specified text data.

In addition, referring to FIG. 5, it may be found that a plurality of pieces of predetermined text data in which a degree of similarity with the re-specified text data (the feature vector of x2, y2, z2) is greater than or equal to a preset value are present. In detail, this is because feature vectors of (x1, y1, z1) and (x4, y4, z4) located within a preset distance d" from the feature vector of x2, y2, z2 are present.

As a result, (x2, y2, z2) may correspond to the re-specified text data, and (x1, y1, z1), (x4, y4, z4) may correspond to the pieces of the predetermined text data.

Although existing text data that is similar to the new text data by the predetermined value or more (primary similarity determination) is not present, the processor 120 may perform a process of transmitting the re-specified text data and the pieces of the predetermined text data to the user terminal 200 so as to receive secondary similarity determination.

In other words, although the text data that is similar to the second text data has not been primarily found in the text data pool, secondarily, the similarity determination may be performed again by comparing the second text data with the re-specified text data and a plurality of predetermined texts.

As a result, the processor 120 may compare each of the pieces of the predetermined text data and the re-specified text data with the second text data (new text data) in the user terminal 200, and receive whether to record the second text data in the text data pool from the user terminal 200.

The user terminal 200 may allow the user to directly compare each of the pieces of the predetermined text data and the re-specified image data with the second text data, and may compare each of the pieces of the predetermined text data and the re-specified text data with the second text data according to the text similarity determination program installed in the user terminal 200.

When any one text data among the text data is determined to be similar to the second text data, the processor 120 may receive a message indicating that the second text data may not be recorded in the text data pool from the user terminal 200.

On the contrary, when all the pieces of the predetermined text data and the re-specified text data are determined to be dissimilar to the second text data, the processor 120 may receive a message indicating that the second text data may be recorded in the text data pool from the user terminal 200.

Meanwhile, the deep learning model according to the present invention may continuously increase accuracy of similarity state determination through self-learning. In this case, the self-learning may be performed by adjusting at least one parameter for performing an operation of the deep learning model.

In detail, it may be assumed that A and B, which are existing text data, are recorded in the text data pool, it may be assumed that a, which is new text data, is acquired, and it may be assumed that the A and the a are identical/similar texts.

In this case, the processor 120 may calculate a feature vector for each of the text data A, B, and a through the deep learning model, and may determine a similarity state of the text data A and a and a similarity state of the text data B and a by calculating a distance between the feature vectors.

When it is found that a distance between a feature vector corresponding to a text A and a feature vector corresponding to a text a is greater than or equal to a predetermined value (it is found that the text A and the text a are dissimilar to each other) as a result of calculating the distance between the feature vectors, the processor 120 may adjust a parameter value of the deep learning model, and may allow the distance between the feature vector corresponding to the text A and the feature vector corresponding to the text a to become less than the predetermined value through the deep learning model having the adjusted value.

In addition, when it is found that a distance between a feature vector corresponding to a text B and the feature vector corresponding to the text a is less than or equal to a predetermined value (it is found that the text B and the text a are similar to each other) as a result of calculating the distance between the feature vectors, the processor 120 may adjust the parameter value of the deep learning model, and may allow the distance between the feature vector corresponding to the text B and the feature vector corresponding to the text a to become greater than the predetermined value through the deep learning model having the adjusted value.

The self-learning process will be described again as follows.

First, first training text data and second training text data may be acquired as data for training (learning), and it may be assumed that first comparison data represents a similarity state of the first training text data and the second training text data.

The first comparison data may represent a similarity state that the two text data are 'similar' or 'dissimilar' to each other.

For reference, the first comparison data refers to data assumed to be true (ground truth), and may correspond to data serving as a reference for a comparison target in the process according to the present invention.

The processor 120 may perform an operation in the deep learning model by using the first training text data and the second training text data as input values, and calculate a first training feature vector corresponding to the first training text data and a second training feature vector corresponding to the second training text data.

In addition, the processor 120 may compare a degree of similarity between the first training feature vector and the second training feature vector to derive second comparison data. In this case, the second comparison data may be calculated based on a distance between a point of the first training feature vector and a point of the second training feature vector, may represent a similarity state such as 'similar' or 'dissimilar', and may correspond to a probability value (75%) representing a degree of similarity.

The processor 120 may adjust at least one parameter of the deep learning model based on the first comparison data and the second comparison data.

For example, while a value of the first comparison data is 'similar', it may be unnecessary to adjust the parameter when a value of the second comparison data is determined to be 'similar', whereas the parameter may be adjusted so that the value of the second comparison data may be calculated to be 'similar' when the value of the second comparison data is determined to be 'dissimilar'.

In addition, when the value of the second comparison data represents a 40% probability of similarity, the processor 120 may adjust the parameter so that a value of the probability may be calculated to be higher.

Figure 6:
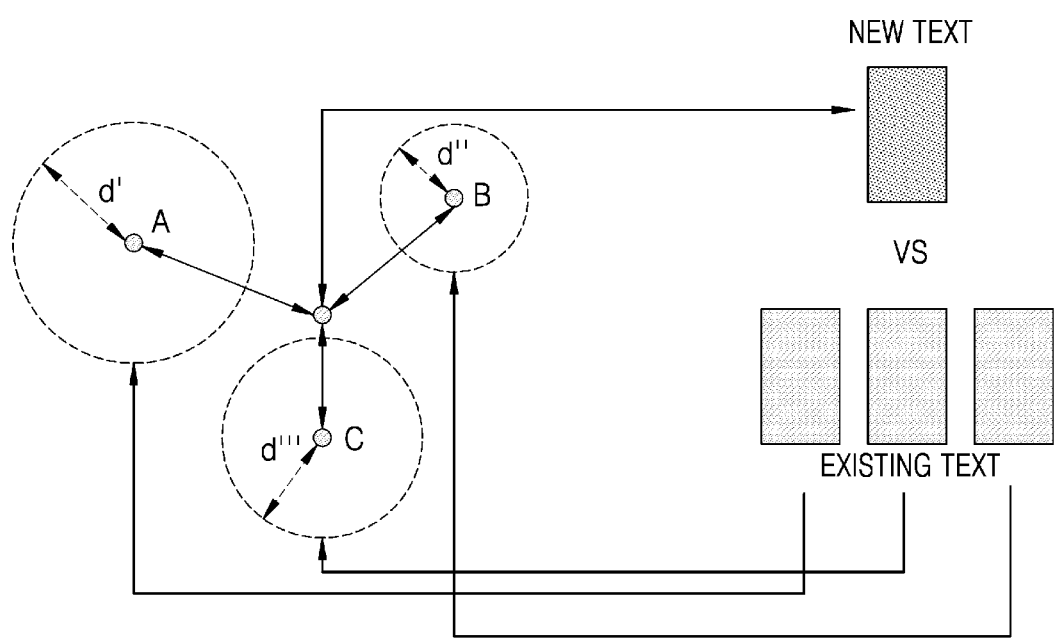
FIG. 6 is a view showing a state in which a new text is included in any one of groups of existing texts according to one embodiment of the present invention.

FIG. 6 is a view showing a state in which a new text is included in any one of groups of existing texts according to one embodiment of the present invention.

As described above, the processor 120 may group a plurality of pieces of existing text data included in the text data pool.

In other words, in FIG. 6, a group including a text A may be set as a group a including a phrase "Hello", a group including a text B may be set as a group b including a phrase "I love you", and a group including a text C may be set as a group c including a phrase "Thank you".

In terms of feature vectors, as shown in FIG. 6, texts located at a distance d' from the text A may constitute one group, texts located at a distance d" from the text B may constitute another group, and texts located at a distance d'" from the text C may constitute still another group. According to settings, unlike in FIG. 6, a group may be formed in various shapes other than a circular shape.

As described above, while the groups a, b, and c are present, a feature vector for new text data may be calculated. The processor 120 may compare feature vectors of the groups a, b, and c with the feature vector for the new text data, and search for a group that is most adjacent to the feature vector for the new text data. Next, the processor 120 may allow the new text data to be included in a most adjacent predetermined group (e.g., the group c).

According to one embodiment, the text C and a new text may be determined to be identical/similar to each other, so that the processor 120 may not record the new text in the text data pool. In other words, the processor 120 may allow the new text data to be included in the most adjacent group (e.g., the group c) and record the new text data in the text data pool as a result of comparing the feature vectors with each other, whereas the processor 120 may not record the new text in the text data pool when the texts included in the group and the new text are determined to be in the same range.

In this case, determination of the same range may also be performed by the comparison using the feature vectors. As a result, the processor 120 may allow the new text to be included in the group c when a feature vector of the new text is spaced apart from a feature vector of existing text (included in the group c) by a distance out of a predetermined distance range (out of the same range) while being within another predetermined distance range (most adjacent to the group c).

The embodiments according to the present invention described above may be implemented in the form of a program instruction that may be executed through various computer components, and may be recorded in a computer-readable recording medium. The computer-readable recording medium may include a program instruction, a data file, a data structure, and the like, alone or in combination with each other. The program instruction recorded on the computer-readable recording medium may be specially designed and configured for the present invention, or may be known and available to those skilled in the art of computer software. An example of the computer-readable recording medium includes magnetic media such as a hard disk, a floppy disk, and a magnetic tape, optical recording media such as a CD-ROM and a DVD, magneto-optical media such as a floptical disk, and a hardware device specially configured to store and execute a program instruction, such as a ROM, a RAM, and a flash memory. An example of the program instruction includes a high-level language code that may be executed by a computer by using an interpreter or the like, as well as a machine language code such as those generated by a compiler. The hardware device may be configured to operate as at least one software module to perform the processing according to the present invention, and vice versa.

Although the present invention has been described above by specified embodiments and drawings as well as certain matters such as specific elements, the embodiments and drawings are provided only to assist an overall understanding of the present invention, so the present invention is not limited to the embodiments, and various changes and modifications can be made from the above description by a person having ordinary skill in the art to which the present invention pertains.

Therefore, the idea of the present invention should not be construed as being limited to the embodiments described above, and the scope of the idea of the present invention encompasses the scope of the appended claims and all variations equivalent thereto or modified equivalently thereto.

The invention claimed is:

1. A method for collecting filtered text data, the method comprising:
    (a) acquiring, by a computing apparatus, first text data, and recording the first text data in a text data pool;
    (b) acquiring, by the computing apparatus, second text data;
    (c) performing, by the computing apparatus, an operation in a deep learning model by using the first text data and the second text data as input values, and calculating a first feature vector corresponding to the first text data and a second feature vector corresponding to the second text data; and
    (d) comparing, by the computing apparatus, a degree of similarity between the first feature vector and the second feature vector, and recording the second text data in the text data pool when the degree of similarity is less than a predetermined value,
    wherein, when a plurality of pieces of the first text data are recorded in the text data pool and the pieces of the first text data include first-first text data and first-second text data, the computing apparatus is configured to:
    calculate a first-first feature vector corresponding to the first-first text data and a first-second feature vector corresponding to the first-second text data through an operation in the deep learning model;
    calculate a first degree of similarity between the first-first feature vector and the second feature vector, and a second degree of similarity between the first-second feature vector and the second feature vector;
    sort the first-first text data and the first-second text data based on a plurality of similarity degrees;
    transmit specific text data among the sorted text data, the specific text data having a degree of similarity that is greater than or equal to the predetermined value, and the second text data to a user terminal to compare the specific text data with the second text data; and
    receive, from the user terminal, whether to record the second text data in the text data pool.

2. The method of claim 1, wherein, in a case where the specific text data having the degree of similarity that is greater than or equal to the predetermined value is not present, while first text data that is determined to be most similar to the second text data among the pieces of the first text data is set as re-specified text data,
    when a plurality of predetermined feature vectors in which a degree of similarity with a feature vector of the re-specified text data is greater than or equal to a preset value are present,
    the computing apparatus is configured to transmit a plurality of pieces of predetermined text data corresponding to the predetermined feature vectors and the re-specified text data to the user terminal so as to compare each of the pieces of the predetermined text data and the re-specified text data with the second text data, and receive whether to record the second text data in the text data pool from the user terminal.

3. The method of claim 1, wherein, when the first feature vector corresponds to a first point that is present in an N dimension, and the second feature vector corresponds to a second point that is present in the N dimension,
    the degree of similarity between the first feature vector and the second feature vector represents a distance between the first point and the second point.

4. The method of claim 1, wherein the computing apparatus is configured to group a plurality of pieces of text data recorded in the text data pool based on a degree of proximity of each of a plurality of feature vectors corresponding to the pieces of the text data.

5. The method of claim 1, wherein, before the step (a),
    while at least one parameter is present to perform the operation of the deep learning model,
    when first comparison data represents a similarity state of first training text data and second training text data,
    the method further comprises:
        (a1) performing, by the computing apparatus, an operation in the deep learning model by using the first training text data and the second training text data as input values, and calculating a first training feature vector corresponding to the first training text data and a second training feature vector corresponding to the second training text data; and
        (a2) comparing, by the computing apparatus, a degree of similarity between the first training feature vector and the second training feature vector to derive second comparison data, and adjusting at least one parameter of the deep learning model based on the first comparison data and the second comparison data.

6. The method of claim 1, wherein the computing apparatus is configured to acquire the first text data and the second text data through crowdsourcing.

7. A computing apparatus, which is an apparatus for collecting filtered text data, the computing apparatus comprising:
    a communication unit for acquiring first text data and second text data; and
    a processor for recording the first text data in a text data pool, performing an operation in a deep learning model by using the first text data and the second text data as input values, calculating a first feature vector corresponding to the first text data and a second feature vector corresponding to the second text data, comparing a degree of similarity between the first feature vector and the second feature vector, and recording the second text data in the text data pool when the degree of similarity is less than a predetermined value,
    wherein, when a plurality of pieces of the first text data are recorded in the text data pool, and the pieces of the first text data include first-first text data and first-second text data, the computing apparatus is configured to:
    calculate a first-first feature vector corresponding to the first-first text data and a first-second feature vector corresponding to the first-second text data through an operation in the deep learning model;
    calculate a first degree of similarity between the first-first feature vector and the second feature vector and a second degree of similarity between the first-second feature vector and the second feature vector;
    sort the first-first text data and the first-second text data based on a plurality of similarity degrees;

transmit specific text data among the sorted text data, the specific text data having a degree of similarity that is greater than or equal to the predetermined value, and the second text data to a user terminal to compare the specific text data with the second text data; and receive, from the user terminal, whether to record the second text data in the text data pool.

\* \* \* \* \*